Aug. 15, 1961   J. S. FREISMUTH   2,996,254
THERMOSTAT
Filed Feb. 4, 1958
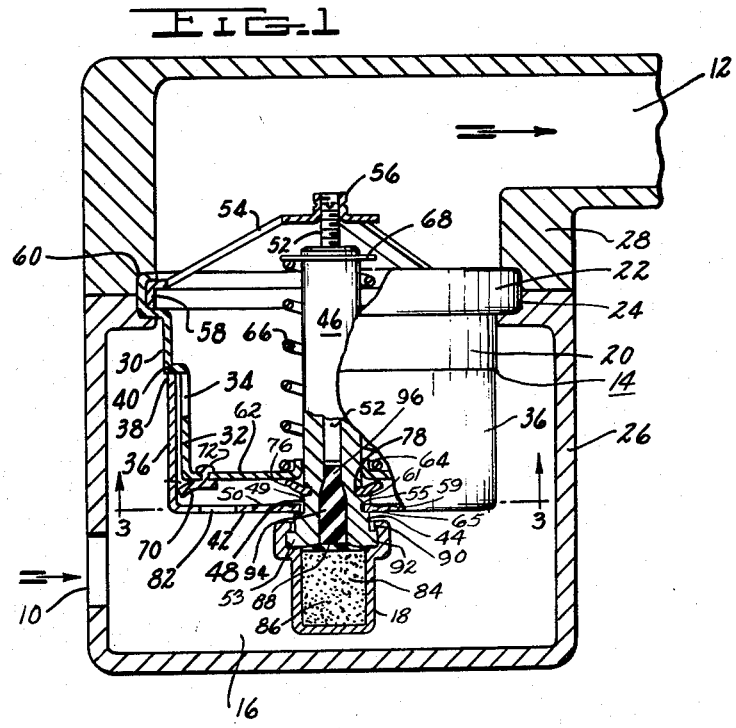
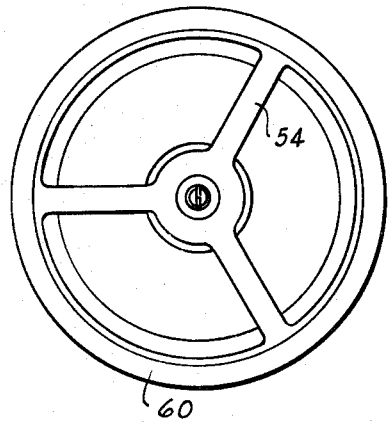
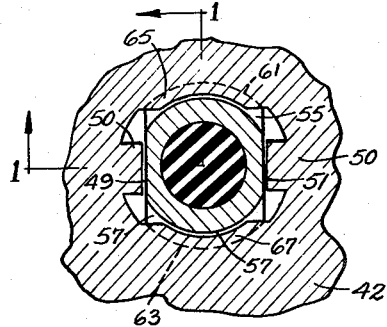
INVENTOR
JOHN S. FREISMUTH
SMITH, WILSON, LEWIS & McRAE
ATTORNEYS

United States Patent Office 2,996,254
Patented Aug. 15, 1961

2,996,254
THERMOSTAT
John S. Freismuth, St. Clair Shores, Mich., assignor to American Radiator & Standard Sanitary Corporation, New York, N.Y., a corporation of Delaware
Filed Feb. 4, 1958, Ser. No. 713,118
1 Claim. (Cl. 236—34)

This invention relates to thermostats and more particularly to a temperature responsive control mechanism operably connected in an improved manner to control a tubular valve element.

In the operation of certain mechanisms, such for example, as liquid cooled engines it is desirable for best results that the device operate within a predetermined temperature range. In the case of the liquid cooled engine this can most easily be accomplished by actuating a valve to close off or materially restrict the circulation of cooling liquids between the block of the engine and the radiator until the temperature of the liquid within the engine block has been heated to a substantially predetermined temperature. A control mechanism or thermostat, responsive to the temperature of the controlled liquid is employed to open the valve when the temperature of the liquid reaches the operating temperature, and thereafter the rate of the flow of liquid is controlled to maintain the operating temperature within the desired range.

An object of this invention is to provide a thermostatically controlled valve of the tubular type having elements movable longitudinally relative to each other at right angles to the direction of liquid flow in such a manner that the actuating forces exerted by the temperature control mechanism are not opposed by the pressure of the liquid being controlled.

A further object of my invention resides in the provision of an improved thermostatically controlled valve having cup-shaped members wherein the movable cup member and its associated thermally responsive control element are positioned on the upstream side of the fluid being controlled.

Another object of this invention is to provide an improved valve which can be fabricated economically from stamping, and which can readily be assembled thereby minimizing the cost of fabricating the valve.

Still a further object of this invention is to provide a substantially balanced valve mechanism so proportioned and constructed that the movable element of the valve structure can readily be actuated by a temperature responsive device positioned within the fluid being controlled by the valve.

Yet a further object of my invention is to provide a pellet-type thermostatically actuated device for controlling the movable element of a pair of axially shiftable cup-type valve members so constructed and arranged that the flow of fluid is substantially at right angles to the direction of movement of the movable valve element, and wherein the radial space between the fixed and movable valve cup members is vented to inlet fluid thereby minimizing the force which must be exerted by the thermostatically controlled element to actuate the movable element of the valve.

Another object resides in the provision of a bayonet-type connection for assembling a temperature responsive device, a stem guide member, and the movable element of the tubular valve member in such a manner that the costs of assembling the unit are minimized.

Other objects and advantages of this invention will be apparent from the following detailed description considered with the accompanying drawing submitted for purposes of illustration only and not intended to define the scope of this invention, reference being had for that purpose to the subjoined claim.

In the drawings wherein similar reference characters refer to similar parts throughout the several views.

FIGURE 1 is an elevational view of a control mechanism embodying my invention, with parts thereof broken away along line 1—1 in FIG. 3.

FIGURE 2 is a top plan view of the control mechanism.

FIGURE 3 is a sectional view taken substantially on the line 3—3 of FIGURE 1, looking in the direction of the arrows.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Referring now more particularly to FIGURE 1 it will be observed that the fluid system has an inlet 10 communicating for example with the water jacket or cooling system of an internal combustion engine. The fluid system has an outlet 12 communicating for example with the radiator or heat exchanger of the engine. It will of course be understood that the invention is not limited to use with water cooled engines, but is applicable to all types of mechanisms wherein a fluid, either liquid or gaseous is controlled to maintain the operating temperature within a predetermined range.

Interposed between the inlet 10 and the outlet 12 of the fluid system is a thermostatically actuated valve 14 for controlling the flow of liquids through the valve 14 in proportion to the temperature of the liquid in a chamber 16 surrounding a temperature responsive device 18.

The valve 14 is of the axially movable type having a fixed or non-movable tubular valve member 20. The tubular valve member 20 which is fixed has an enlarged circular section 22 clampingly engaged in a recess 24 formed for example between a lower housing 26 and an upper housing 28. The tubular valve member 20 has a cylindrical or tubular shaped valve section 30 having a section of reduced diameter 32 provided with apertures 34 adjacent the juncture between the sections 30 and 32 of different diameters.

A movable tubular valve member 36 is telescopingly mounted on the section 32 of reduced diameter of the fixed valve member 20, and has an outer edge 38 adapted to engage the inwardly stepped flange section 40 of reduced diameter between the sections 30 and 32 of different diameters. The connection of juncture between the outer edge 38 of the movable valve member 36 and the flange section 40 of the fixed valve member 20 engages in substantially fluid tight relation.

The movable valve member 36 has an inwardly extending flange 42 provided with a central aperture 44 for the reception of a stem guide member 46. The stem guide member 46, the temperature responsive device 18, and the inwardly directed flange 42 of the movable valve member 36 are secured together by a bayonet-type connection 48 as more clearly illustrated in FIGURE 3. It will be noted that lugs 50 are deflected into the path of the movable element of the bayonet connection to prevent unintentional rotation or disassembly of the device.

Connection 48 is defined in part by forming guide member 46 with two vertical flat surafces 49 and 51 extending upwardly from the cylindrical section 53. The wall areas 61 and 63 between the two flat surfaces are grooved as at 55 and 57 so as to provide two downwardly facing shoulders, one of which is shown at 59 in FIG. 3. Wall portion 42 of member 36 is provided with two lugs 50 which in the illustrated position of parts have their edges in close proximity to the flat surfaces 49 and 51 to prevent turning of member 46 relative to member 36. Vertical movement of member 46 relative to member 36 is provided by the disposition of edge portions 65 and 67 of member 46 within grooves 55 and 57.

In the procedure for installing the temperature responsive device 18 onto member 36 device 18 is inserted into the space between lugs 50 in a position rotated ninety degrees from that shown in FIG. 3; i.e. the surfaces of wall areas 61 and 63 ride up on the free edges of lugs 50. When the stem guide member 46 has been advanced the desired vertical distance device 18 is rotated ninety degrees so that grooves 55 and 57 slide onto wall areas 65 and 67 as shown in FIG. 3. Lugs 50 are then deflected down to engage flat surfaces 49 and 51.

The stem guide member 46 is slidably mounted on a rod 52 secured in a spider 54 by a nut 56. The spider 54 has a plurality of legs, three in the embodiment illustrated, connected to a circumferential ring 58 secured in the enlarged circular section 22 of the fixed valve member 20 by an inwardly directed bead 60 spun over or otherwise clamped to the circumferential ring 58.

The section 32 of reduced diameter of the fixed valve member 20 has an inwardly extending flange 62 terminating in an upwardly deflected edge portion defining a seat for a spring 66 which yieldingly urges the movable valve member 36 toward the closed or fluid obstructing position. The opposite end of the spring 66 engages an abutment 68 carried by the guide 46.

The inwardly extending flange 62 of the fixed valve member 20 has an outer seal 70 secured thereto as by an enlarged extension and engaging the inner surface 74 of the movable valve member 36 to prevent the flow of liquid between the fixed and movable valve elements. A seal 76 positioned in a groove 78 of the stem guide member 46 is provided to engage the lower inner edge surface of the inwardly extending flange 62 when the movable valve element 36 is in the closed position with reference to the valve section 30 of the fixed valve member 20 as shown in FIG. 1. It will be noted that the slight unbalanced pressure caused by the pressure of liquid in chamber 16 over the area of the small seal 76 cooperates with the force exerted by the spring 66 to return the movable valve element 36 to the closed or fluid obstructing position at a temperature near to the setting position.

It will be noted that the inwardly extending flange 42 or bottom of the cup-shaped valve member 36 is provided with vent apertures 82 to equalize pressures on opposite sides thereof. In this manner it is unnecessary for the temperature responsive device 18 to overcome a force exerted by the fluid pressure being controlled.

The temperature responsive device 18 has a chamber 84 in which thermally expansible material 86 may be positioned. The thermally expansible material 86 may be of any desired type and for ease of preparation and assembly it is preferably formed in pellet shape, substantially contoured to completely fill the chamber 84. An elastic diaphragm 88 preferably having a thickened central section is positioned on top of the expansible material 86, and is secured thereto as by spinning or otherwise deflecting inwardly the upper edge to define an inwardly directed flange 90 to overlie a cap member 92 having therein a central passage 94 to receive a deformable plug 96 operable to exert a longitudinal force on the rod 52.

The operation of this device is as follows: Assuming that my improved control mechanism is employed to maintain the temperature of an internal combustion engine within a predetermined temperature range, and that the engine is started while cold. The thermally expansible material 86 in the chamber 84 of the temperature responsive element will be contracted by the force of the spring 66 exerting a force on the stem guide member 46. The outer edge 38 of the movable valve member 36 will then engage the flange section 40 between the section 30 and the reduced section 32 of the fixed valve member 20 thereby interrupting or preventing the flow of fluid from the inlet port 10 to the outlet port 12.

As the temperature of the liquid in the chamber 16 rises due to operation of the engine, the expansible material 86 in the chamber 84 of the temperature responsive device 18 will become heated thereby exerting a force through the plug 96 on the rod 52 which results in a downward movement, as viewed in FIGURE 1, of the stem guide member 46 and temperature responsive device 18 together with the movable valve member 36. As the outer edge 38 of the movable valve member 36 separates from the flange section 40 of the fixed valve member 20, fluid or liquid under pressure in the chamber 16 flows between the valve sections through the aperture 34 in the fixed valve member 20, upwardly through the space between the legs of the spider element 54 and out through the outlet passage 12 to the radiator. As the engine operating temperature continues to increase, the thermally expansible material 86 expands further, resulting in an increased opening of the space between the fixed and movable valve elements 20 and 36 to increase the flow of heated fluid through the valve member 14. The liquid flowing from the outlet passage 12 is directed through the heat exchanger or radiator thereby reducing its temperature. As the temperature of the liquid is reduced in the radiator the liquid returned to the engine and inlet port 10 is reduced. By suitably calibrating the quantity and the coefficient of expansion of the materal 86, the strength of the spring 66, and the area of the valve that is opened, it is readily possible to maintain the engine operating temperatures within a desired predetermined range.

Since the inwardly directed flange 42 or bottom of the movable valve element 36 is vented by apertures 82 it will be noted that fluid pressure on opposite sides thereof are equalized whereupon it is unnecessary for the temperature responsive device 18 to overcome or operate in opposition to the fluid pressure of the liquid within the chamber 16. It will be noted that as the movable valve element 36 moves axially relatively to the fixed valve member 20, the flow of liquid through the valve is substantially at right angles to the direction of travel of the movable valve member whereupon the minimum of fluid pressure forces are exerted on the valve mechanism.

While the invention has been described with particular reference to a specific embodiment it will be apparent that various changes can be made in the specific mechanisms without departing from the spirit of my invention as defined by the following claim.

I claim:

Valve structure comprising a fixed member formed of sheet material having a tubular side wall provided with a section of reduced diameter, there being a stepped flange connecting the sections of different diameters which forms a valve seat, said section of reduced diameter having flow apertures therein adjacent the valve seat, an end wall closing the upstream end of said section of reduced diameter and forming therewith a substantially cup-shaped construction, a spider of sheet material having an annular rim secured to the downstream end of the tubular side wall, said spider having a central nut portion formed with an internally threaded opening, a tubular valve member slidably telescoped on the section of reduced diameter and engageable with the valve seat for opening and closing the flow apertures, a thermostatic power element including a container portion carried on the upstream end area of the tubular valve member and having a sleeve structure slidably extended through said end wall, thermally expansible material within said container portion, a piston carried within the sleeve structure and slidable with respect thereto, said piston having a threaded end received within the threaded opening of the nut portion of the spider, compression spring means between the end wall and sleeve structure for moving the tubular valve member on fluid temperature decrease, a series of holes formed in said end wall, an annular sealing flap having integrally formed lug portions extended through said holes to removably mount said flap on the upstream face of the end wall, said flap being of greater major diameter than the internal diameter of the tubular valve member so as to have its outer area deflected by fluid pressure into sealing engagement with said tubular valve member, and a seal fixed to and surrounding said sleeve within the tubular valve member and engageable with said end wall when the valve is closed, to effect a seal between said end wall and the sleeve to prevent escape of fluid to the downstream side of said end wall.

References Cited in the file of this patent

UNITED STATES PATENTS

| | | |
|---|---|---|
| 2,294,331 | Douglas | Aug. 25, 1942 |
| 2,309,446 | Ekkebus | Jan. 26, 1943 |
| 2,765,983 | Mayo | Oct. 9, 1956 |
| 2,810,524 | Puster | Oct. 22, 1957 |
| 2,829,834 | Drapeau | Apr. 8, 1958 |
| 2,872,117 | Puster | Feb. 3, 1959 |
| 2,872,119 | Puster | Feb. 3, 1959 |